US008755694B2

(12) United States Patent
Eiselt

(10) Patent No.: US 8,755,694 B2
(45) Date of Patent: Jun. 17, 2014

(54) METHOD AND A SYSTEM WITH DISTORTION COMPENSATION

(75) Inventor: Michael Eiselt, Kirchhelm (DE)

(73) Assignee: Adva Optical Networking SE, Meiningen Ot Dreissigacker (DE)

( * ) Notice: Subject to any disclaimer, the term of this patent is extended or adjusted under 35 U.S.C. 154(b) by 566 days.

(21) Appl. No.: 12/970,326

(22) Filed: Dec. 16, 2010

(65) Prior Publication Data

US 2011/0206382 A1 Aug. 25, 2011

(30) Foreign Application Priority Data

Feb. 19, 2010 (EP) .................................... 10154051

(51) Int. Cl.
*H04B 10/00* (2013.01)
(52) U.S. Cl.
USPC ........... 398/159; 398/158; 398/147; 375/285; 375/296
(58) Field of Classification Search
USPC ............ 398/147, 158, 159, 81; 375/285, 284, 375/296, 346
See application file for complete search history.

(56) References Cited

U.S. PATENT DOCUMENTS

| 6,724,331 B1 * | 4/2004 | El-Ghoroury et al. ......... 341/118 |
| 6,940,916 B1 * | 9/2005 | Warner et al. .................. 375/261 |
| 2006/0188038 A1 | 8/2006 | Shako et al. |

FOREIGN PATENT DOCUMENTS

| EP | 2 106 044 A1 | 9/2009 |
| WO | WO 2008/074085 A1 | 6/2008 |

OTHER PUBLICATIONS

Extended European Search Report for EP Patent Application 10154051.6-2415 (Jul. 28, 2010).
Yamakazi et al., "Nonlinearity Compensation in WDM Transmission," IEEE/LEOS Summer Tropical Meetings, 2008 Digest of the IEEE, Piscataway, NJ, USA, pp. 165-166 (Jul. 21, 2008).

* cited by examiner

*Primary Examiner* — M. R. Sedighian
(74) *Attorney, Agent, or Firm* — Jenkins, Wilson, Taylor & Hunt, P.A.

(57) ABSTRACT

The invention relates to a method and an apparatus for distortion compensation of signals transmitted via a bidirectional link between a client device and a host device, said method comprising the steps of performing a post-distortion-compensation for an upstream signal received by the host device on said bidirectional link by adjusting post-compensation parameters of a post-compensation unit of said host device and transforming the adjusted post-compensation parameters into pre-compensation parameters of a pre-compensation unit of said host device which performs a pre-distortion compensation for a downstream signal transmitted by said host device via said bidirectional link to said client device.

18 Claims, 3 Drawing Sheets

METHOD AND A SYSTEM WITH DISTORTION COMPENSATION

PRIORITY CLAIM

This application claims the benefit of European Patent Application No. 10154051.6 filed Feb. 19, 2010, the disclosure of which is incorporated herein by reference.

The invention relates to a method and a system comprising distortion compensation of signals transmitted via a bidirectional link between a client device and a host device.

TECHNICAL BACKGROUND

Data signals can be transmitted between a client device and a host device via a bidirectional link, i.e. in both directions over a transmission medium such as a wired link or a wireless link. A data signal can be sent as an electronic signal via a cable or as an optical data signal via an optical link such as one or several fibres. Furthermore, data can be exchanged between a transceiver of a host device and a transceiver of a client device on a wireless link over air by means of electromagnetic waves. When transmitting a signal via a transmission medium such as a wireless or wired link, the signal will be impaired by different external influences such as noise or distortions. Since the distances for example in access networks as well as data rates are increasing, impairments caused by the transmission medium become a limit so that a distortion compensation becomes necessary.

Accordingly some data transmission systems comprise on the receiving side means for performing a distortion compensation of the received data signal. These means perform a post-compensation of impairments caused by the data transmission channel to improve the quality of the received signal. Other data transmission systems perform a pre-distortion of the transmitted signal based on feedback information received from the receiver indicating the quality of the received signal. In such a conventional data transmission system the transmitter can comprise pre-distortion means for pre-distorting the transmitted signal and a separate communication channel has to be provided in the data transmission link between the receiver and the transmitter for sending the feedback information data from the receiver back to the transmitter indicating the quality of the data signal received via other communication channels on the same data transmission medium. The separate communication channel used for sending the feedback information data from the receiver back to the transmitter occupies a data transmission bandwidth of its own so that the data rate of the data signal which is exchanged between the client and host device on the other communication channels of said data transmission medium is diminished.

Accordingly it is an object of the present invention to provide a method and a system which minimizes the impact of signal impairments caused by a data transmission medium by performing a distortion compensation without diminishing the available bandwidth for data exchange between a client device and a host device.

SUMMARY

The invention provides a method for distortion compensation of signals transmitted via a bidirectional link between a client device and a host device, that method comprising the steps of:

a) performing a post-distortion-compensation for an upstream signal received by the host device on said bidirectional link by adjusting post-compensation parameters of a post-compensation unit of said host device; and b) transforming the adjusted post-compensation parameters into pre-compensation parameters of a pre-compensation unit of said host device which performs a pre-distortion compensation for a downstream signal transmitted by said host device via said bidirectional link to said client device.

With the method according to the present invention no separate communication channel between the host and the client device for exchanging feedback information data indicating the quality of a received signal has to be provided. Accordingly, the complete bandwidth of the transmission medium of the bidirectional link can be used for transmitting an upstream signal from the client device to the host device and for transmitting a downstream signal from the host device to the client device thus maximizing the possible data transfer rate.

In an embodiment of the method according to the present invention a distortion vector is provided depending on post-compensation parameters which are read from the post-compensation unit when the adaptive post-distortion compensation of the upstream signal is accomplished.

In a possible embodiment the distortion vector comprises distortion indicator values indicating an extent of distortion caused by the bidirectional link.

In a possible embodiment of the method according to the present invention the distortion indicator values can comprise one or several of the following values comprising a chromatic dispersion, a polarization mode dispersion, a self phase modulation, a bandwidth restriction and a multipath interference caused by said bidirectional link.

In a possible embodiment of the method according to the present invention a pre-compensation parameter vector is provided depending on the distortion vector and supplied to the pre-compensation unit which performs an adaptive pre-distortion compensation for the downstream signal depending on the calculated pre-compensation parameter vector.

In a possible embodiment the bidirectional link is formed by an optical link for transmission of optical signals.

In a possible embodiment of the method according to the present invention the optical link is formed by at least one optical fibre.

In a possible embodiment of the method according to the present invention the bidirectional link is formed by at least one electrical conductive wire for transmission of electrical signals.

In a further embodiment of the method according to the present invention the bidirectional link is formed by a wireless link for transmission of radio signals.

In a possible embodiment of the method according to the present invention an adaptive post-distortion compensation is performed by the post-distortion compensation unit by minimizing or maximizing a target value of a target function.

In a possible embodiment of the method according to the present invention the target value comprises a bit error rate BER.

In a further possible embodiment of the method according to the present invention the target value comprises an eye signal opening of the received upstream signal received by the host device.

In a further possible embodiment of the method according to the present invention the target function comprises more than one target value, e.g. a bit error rate BER and an eye signal opening of received upstream signal received by the host device.

In a possible embodiment of the method according to the present invention the pre-compensation parameters of the pre-compensation parameter vector are provided by reading out a selectable lookup table depending on the distortion vector.

In a further possible embodiment the pre-compensation parameters of the pre-compensation parameter vector are provided by multiplying a transformation matrix with the distortion vector.

In a possible embodiment the lookup tables comprising the pre-compensation parameters are stored in a data memory of the host device.

In a possible embodiment the data memory of the host device stores one or several transformation matrices to be multiplied with the distortion vector D.

In a possible embodiment of the method according to the present invention the data memory stores several lookup tables or transformation matrices which are selected depending on the type of the bidirectional link between the client device and the host device.

The invention further provides a host device having the features of claim.

The invention provides a host device comprising:
  a host transmitter for transmitting a downstream signal via a bidirectional link to a client device;
  a host receiver for receiving an upstream signal via said bidirectional link from said client device;
  a predistortion compensation unit for performing a predistortion compensation of said downstream signal transmitted by said host transmitter via said bidirectional link to said client device by adjusting pre-compensation parameters;
  a post-distortion compensation unit for performing a post-distortion compensation of said upstream signal received via said bidirectional link by said host receiver from said client device by adjusting post-compensation parameters and
  a transformation unit which transforms the adjusted post-compensation parameters provided by said post-distortion unit into pre-compensation parameters of said pre-distortion compensation unit.

The invention provides a data transmission system comprising at least one host device comprising:
  a host transmitter for transmitting a downstream signal via a bidirectional link to a client device;
  a host receiver for receiving an upstream signal via said bidirectional link from said client device;
  a predistortion compensation unit for performing a predistortion compensation of said downstream signal transmitted by said host transmitter via said bidirectional link to said client device by adjusting pre-compensation parameters;
  a post-distortion compensation unit for performing a post-distortion compensation of said upstream signal received via said bidirectional link by said host receiver from said client device by adjusting post-compensation parameters and
  a transformation unit which transforms the adjusted post-compensation parameters provided by said post-distortion unit into pre-compensation parameters of said pre-distortion compensation unit, and
at least one client device connected to said host device via one or several bidirectional links said bidirectional link being formed by an optical link, an electrical wired link or a wireless link.

In a possible embodiment of the data transmission system according to the present invention the data transmission system comprises an access network.

BRIEF DESCRIPTION OF THE FIGURES

In the following, possible embodiments of the method and system for distortion compensation of signals transmitted via a bidirection link between a client device and a host device are described with reference to the enclosed figures.

DETAILED DESCRIPTION OF EMBODIMENTS

Figure 1:
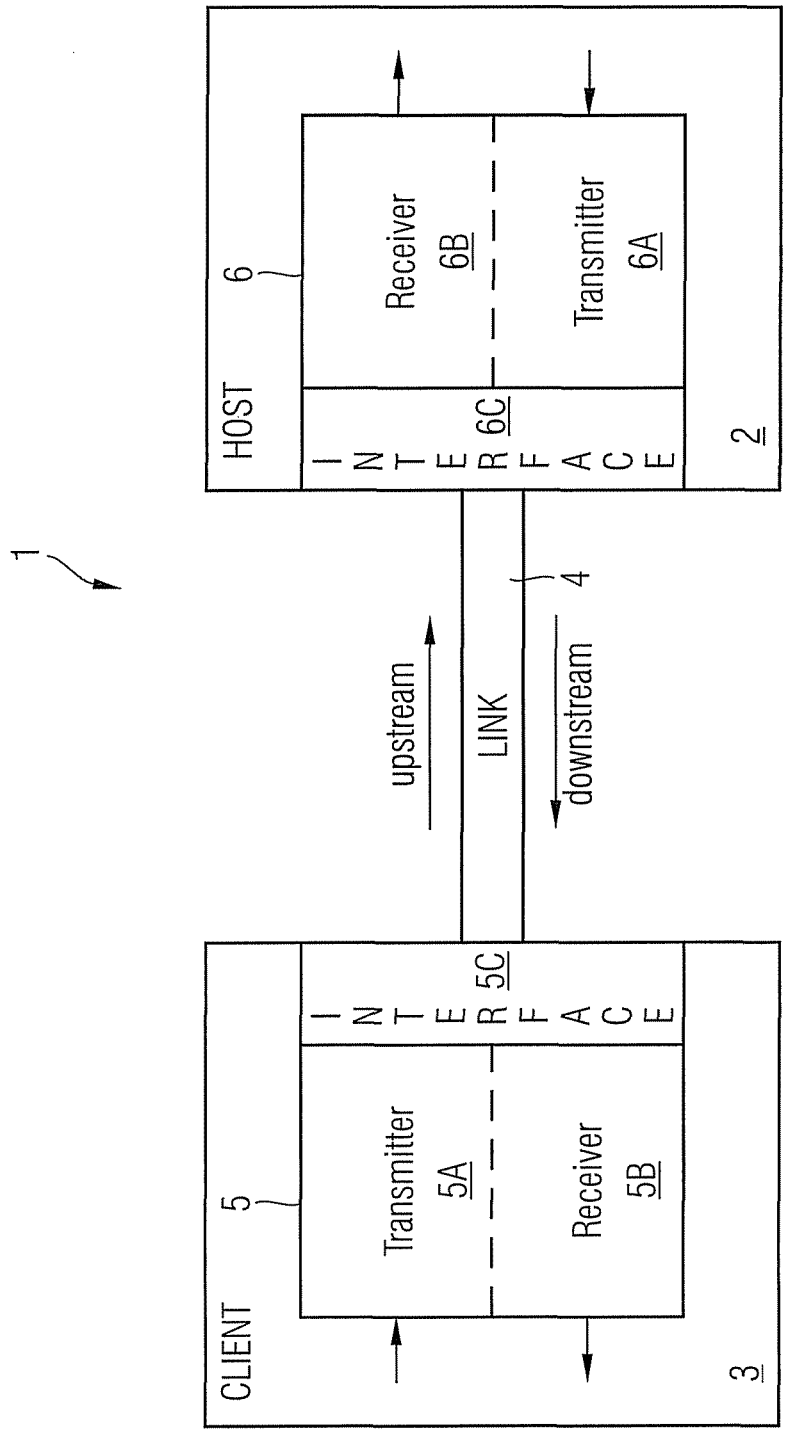
FIG. 1 shows a block diagram of a possible embodiment of a data transmission system according to the present invention.

As can be seen from FIG. 1 a data transmission system 1 according to the present invention comprises at least one host device 2 and at least one client device 3 which are connected with each other via a bidirectional link 4. The numbers of client devices and host devices can vary. In a possible embodiment several client devices 3 are connected to a host device 2 via the same or different bidirectional links 4. The bidirectional data link 4 can be a wired link or a wireless link. Furthermore, the bidirectional link 4 can be in a possible embodiment be an optical link comprising one or several fibres. As can be seen from FIG. 1 the client device 3 comprises a transceiver 5 having a transmitter 5A, a receiver 5B and an interface 5C. The transmitter 5A receives data from a data source of the client device 3 and the receiver 5B forwards received data to a data sink of the client device 3. The host device 2 also comprises a transceiver 6 including a transmitter 6A, a receiver 6B and an interface 6C. In a possible embodiment the transceivers 5, 6 can be plugged into the respective device 3, 2. In a possible embodiment the client device 3 is a mobile device connected to the host device 2 via wireless link. The host device 2 can be connected to a data network. In a possible embodiment the host device 2 forms part of an access network for the client device 3.

In an alternative embodiment the bidirectional transmission link is formed by an optical link. In this embodiment the host device 2 can be provided at the OLT (optical line termination) side of the link.

Figure 2:
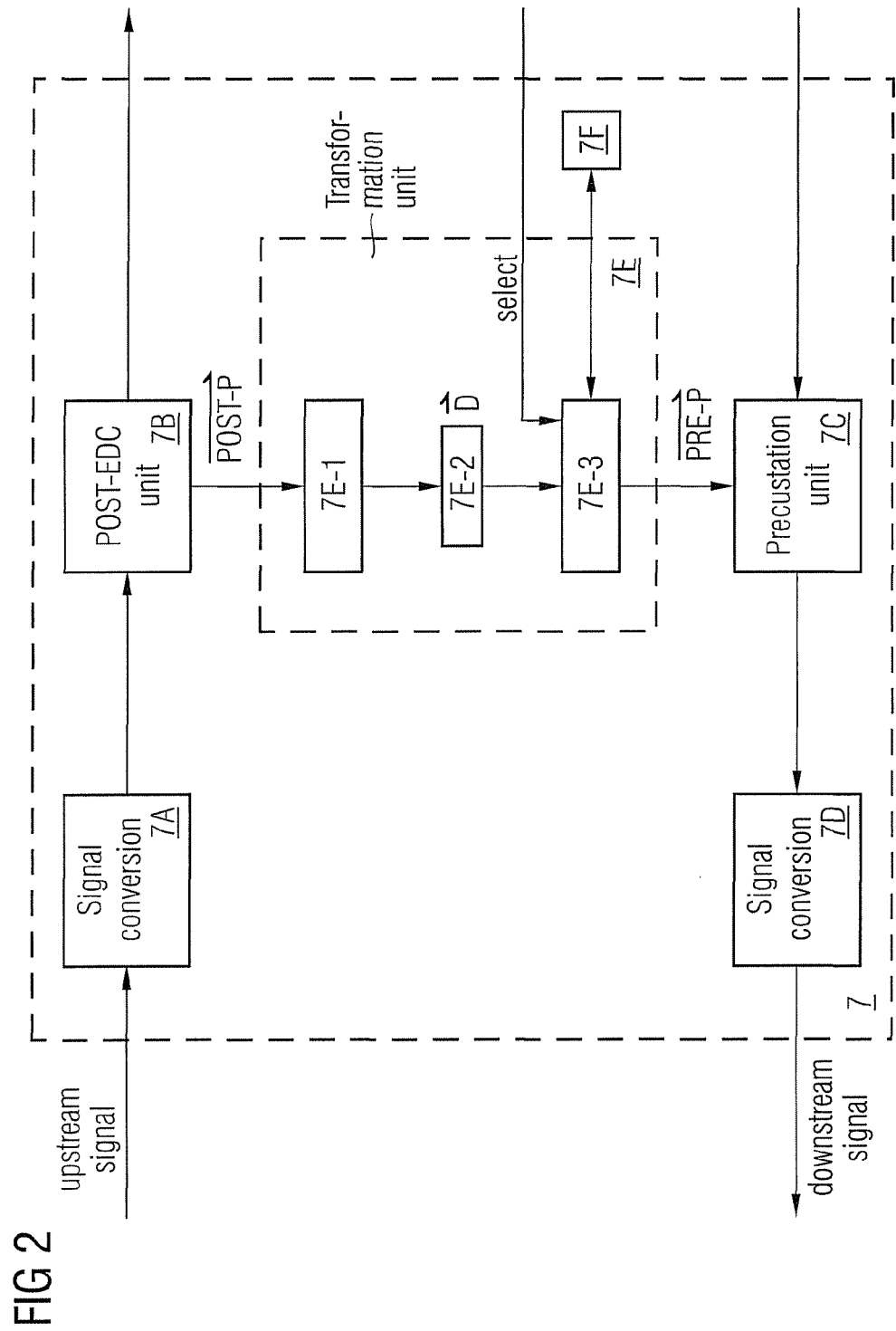
FIG. 2 shows a block diagram of a distortion compensation unit within a host device for illustrating a possible embodiment of the present invention.

FIG. 2 shows a block diagram of a distortion compensation unit 7 performing a distortion compensation according to the present invention. This distortion compensation unit 7 can in a possible embodiment be integrated in the interface 6C of the transceiver 6 of the host device 2. In the shown embodiment the distortion compensation unit 7 performs a distortion compensation of signals transmitted via the bidirectional link 4 between the client device 3 and the host device 2. The upstream signal and the downstream signal can comprise the same or different data rates. In the embodiment shown in FIG. 2 the upstream signal and the downstream signal are transmitted via an optical link comprising one or several optical fibres. As can be seen in FIG. 2 the distortion compensation unit 7 comprises a signal conversion unit 7A which performs a signal conversion from the optical domain into the electrical signal domain. If the upstream data signal transmitted via the bidirectional link 4 from the client device 3 to the host device 2 is already an electrical signal the signal conversion unit 7A is not necessary. In a possible embodiment the signal conversion unit 7A can be bypassed by a multiplexer and demultiplexer under control of a control signal which allows to use the distortion compensation unit 7 both for an electrical and non-electrical upstream signal such as an optical signal. The signal conversion unit 7A is connected to a post-distortion compensation unit 7B which performs a post-distortion compensation of the upstream signal received by the host device 2 via the bidirectional link 4 by adjusting post-compensation parameters of the post-compensation unit 7B. The output signal of the post-distortion compensation unit 7B can be provided to the receiver 6B of the transceiver 6 within the host device 2 as shown in FIG. 1. In a possible embodiment a pluggable transceiver is provided to allow the different interfaces for electrical and optical signals.

In the embodiment shown in FIG. 2 the reception signal path of the distortion compensation unit 7 comprises a signal conversion unit 7A and the post-distortion compensation unit 7B. The distortion compensation unit 7 as shown in FIG. 2 further has a data transmission signal path comprising a pre-distortion unit 7C and a signal conversion unit 7D. The pre-distortion unit 7C can receive a data signal from the transmitter 6A or any other kind of data source. The pre-compensation unit 7C performs a pre-distortion compensation for the downstream signal transmitted by the host device 2 via the bidirectional link 4 to the client device 3. In the shown embodiment the pre-distortion is performed in the electrical domain and then a signal conversion into the optical domain can be performed by the signal conversion unit 7D.

As can be seen in FIG. 2 the distortion compensation unit 7 further comprises a transformation unit 7E between the post-distortion compensation unit 7B and the pre-distortion compensation unit 7C.

When performing the post-distortion compensation of the received upstream signal the post-distortion compensation unit 7B adjusts post-compensation parameters which can form a post-compensation parameter vector POST-P as shown in FIG. 2. The transformation unit 7E transforms the adjusted post-compensation parameters into pre-compensation parameters for the pre-compensation unit 7C of the host device 2. The pre-compensation parameters can form a pre-compensation parameter vector PRE-P as shown in FIG. 2. The pre- and the post-compensation parameter vectors can comprise a different number of parameters of different physical entities.

In a possible embodiment the post-compensation parameters are read from the post-compensation unit 7B when an adaptive post-distortion compensation of the upstream signal is accomplished. The transmission unit 7E can comprise a first calculation unit 7E-1, which calculates the distortion vector D depending on the post-compensation parameters after the post-distortion compensation of the upstream signal by the post-distortion compensation unit 7B has been finished. The calculated distortion vector D comprises distortion indicator values indicating an extent of distortion caused by the bidirectional link 4. In a possible embodiment the distortion vector D is stored temporarily in a register or a data memory 7E-2 of the transformation unit 7E. The distortion vector D can comprise a plurality of distortion indicator values comprising one or several of the following distortion indicators, i.e. chromatic dispersion CD, a polarization mode dispersion PMD, a self phase modulation, a bandwidth restriction or even a multipath interference caused by the bidirectional link 4. Further possible distortion indicator values can be a differential group delay DGD or an optical signal to noise ratio OSNR. An important distortion indicator for data transmission via a bidirectional optical link is the chromatic dispersion CD. The optical data signal is distorted by chromatic distortion in the optical fibres. The distortion spreads the power of one bit to neighbouring bits resulting in an inter symbol interference ISI between neighbouring data bits. After signal conversion in the signal conversion unit 7A the post-compensation unit 7B can perform a compensation for example by means of a feed forward equalizer FFE which recovers the distorted signal. In such a feed forward equalizer the current signal value as well as pre- or post-cursors of the received signal are linearly weighted by tap coefficients and summed to produce an output signal. Tap coefficients are detected by the inter-symbol interference ISI effects. In this exemplary embodiment the post-compensation unit 7B provides tap coefficients as post-compensation parameters which can be supplied to the transformation unit 7E. In a possible embodiment the post-compensation unit 7B performs an adaptive adaption algorithm to optimize a target value of a target function such as a bit error rate BER or an eye signal opening of the received upstream signal received by the host device 2. As can be seen in FIG. 2 the transformation unit 7E can comprise a further unit 7E-3 which provides a pre-compensation parameter vector PRE-P depending on the distortion vector D wherein the pre-compensation parameter vector PRE-P is provided to the pre-distortion compensation unit 7C. The pre-compensation unit 7C performs an adaptive pre-distortion compensation of the downstream signal depending on the calculated pre-compensation parameter vector PRE-P.

In a possible embodiment pre-compensation parameters of the pre-compensation parameter vector PRE-P are generated by reading out a selectable lookup table depending on the distortion vector D. In a possible embodiment these lookup tables can be stored in a data memory 7F as shown in FIG. 2. Accordingly, in a first embodiment the pre-compensation parameters of the pre-compensation parameter vector PPE-P are generated by reading out a selectable lookup table depending on the temporally stored distortion vector D stored in the memory 7E-2. In an alternative embodiment the pre-compensation parameters of the pre-compensation parameter vector PRE-P are calculated by multiplying a selectable transformation matrix T with the distortion vector D stored in the memory 7E-2. In a preferred embodiment several lookup tables LT or transformation matrices T are stored in the data memory 7F of the distortion compensation unit 7 as shown in FIG. 2. These different lookup tables LT or transformation matrices T can be provided for different kinds of bidirectional data links 4. For example a different lookup-table LT and a different transformation matrix T can be stored in the memory 7F for different transmission media such as an optical wired transmission medium, an electrical wired transmission medium or a wireless transmission medium. In a possible embodiment the host device 2 applies a selection control signal to the pre-compensation parameter vector generation unit 7E-3 which selects the corresponding lookup-table LT or transformation matrix T stored in the memory 7F. The selection control signal can for example indicate whether the bidirectional link 4 is an optical link or a cable for electrical data transmission.

The distortion compensation unit 7 as shown in FIG. 2 takes advantage of the fact that there is a high physical correlation between distortions which take place in the upstream and downstream signal direction of the bidirectional link 4, in particular when a single common transmission medium such as an optical fibre is used to transport signals in both directions such is often the case in access networks. The bidirectional link 4 is formed by one or several optical fibres and distortion caused by optical fibres is efficiently compensated by the distortion compensation unit 7 because the signals in both directions going through the same optical cable comprising one or several fibres experience the same fibre impairments. Since both distortion compensation and pre-distortion compensation are performed on the same side of the bidirectional data transmission link 4 no feedback control signals have to be transmitted via the bidirectional link 4 thus saving bandwidth and increasing the data transmission rate. Since no feedback control signal with distortion information has to be carried over the bidirectional link 4 it is further avoided that this distortion information signal can be distorted itself by the transmission medium thus avoiding an erroneous compensation of the signal. The post-compensation unit 7B which performs a distortion compensation of the received signal can use different techniques to perform the compensation such as feed forward equalization, decision feedback equalization or maximum likelihood sequence estimation.

The pre-distortion compensation unit 7C generates a pre-distorted signal in such a way that the distorting effects caused by the data transmission medium of the bidirectional link 4 reverse the distortion during transmission resulting in the desired signal at the receiving side of the downstream signal, i.e. at the side of the client device 3.

In a possible embodiment post-compensation of the upstream signal and the pre-compensation of the downstream signal is performed in the analogue signal domain. In an alternative embodiment the post-compensation of the upstream signal and the pre-compensation of the downstream signal are performed in the digital domain. In this embodiment a signal generated by the signal conversion unit 7A, i.e. the electrical signal is first converted by an analogue digital converter ADC into a digital signal and then processed by the post-compensation unit 7B. A digital data stream coming from a data source of the host device 2 can be processed by a digital pre-distortion unit 7C. If pre-distortion is performed in the analogue domain the digital data stream received from the data source of the host device 2 is first converted by a digital analogue converter DAC into an analogue signal to perform the pre-distortion in the analogue signal domain.

In a possible embodiment a data memory 7F can be programmed via an interface by the host device 2 to update lookup-tables LT or transformation matrices T for the respective data link 4.

In a possible embodiment the signal distortion compensation unit 7 as shown in FIG. 2 can be plugged into the transceiver 6 of the host device 2, i.e. the distortion compensation unit 7 is in this embodiment exchangeable.

In a possible embodiment the post-compensation by the post-compensation unit 7B is based on a measure of the quality of the received signal and the measure of quality of the received signal can be an signal eye opening or, when a framing format with error checking or correcting overhead is used, a bit error rate BER of the compensated signal. A compensation of the received upstream signal yields compensation parameters which are a measure for a distortion which the upstream signal has experienced. For the downstream signal this distortion information is used to introduce pre-distortion to the downstream signal.

Figure 3:
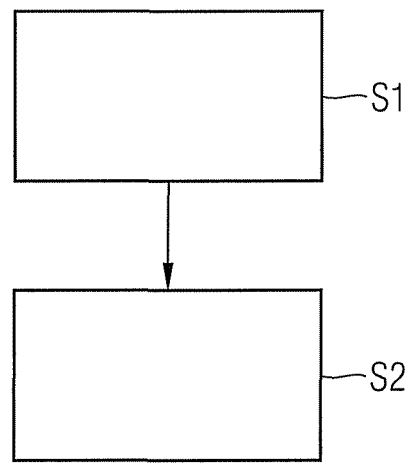
FIG. 3 shows a flowchart of a possible embodiment of a method for distortion compensation of signals according to the present invention.

FIG. 3 shows a flowchart illustrating a possible embodiment of the method for distortion compensation of signals according to the present invention.

In a first step S1 a post-distortion compensation is performed for an upstream signal received by the host-device 2 via the bidirectional link 4 by adjusting post-compensation parameters of the post-compensation unit 7B of the host device 2.

In a further step S2 the adjusted post-compensation parameters are transformed into pre-compensation parameters of a pre-compensation unit 7C of the host device 2 which performs a pre-distortion compensation for the downstream signal transmitted by the host device 2 via the bidirectional link 4 to the client device 3.

The method shown in FIG. 3 can be performed in the digital or in the analogue signal domain. Furthermore, the method shown in FIG. 3 can be performed by a computer program which is executed on a computation unit integrated in the transformation unit 7E as shown in FIG. 2. This computation unit can be connected to the post-compensation unit 7B and the pre-compensation unit 7C. In a possible embodiment this computation unit comprises at least one microprocessor. In a possible embodiment the host device 2 as shown in FIG. 1 can form part of an access network. For example the host device 2 can be integrated into a base station of an access network providing a wireless link to one or several client devices 3.

In a possible embodiment the distortion compensation unit 7 as shown in FIG. 2 is integrated in the transceiver 6 of the host device 2 for example in the interface 6C of the transceiver 6. In an alternative embodiment the distortion compensation unit 7 is a separate device which is provided between the bidirectional link 4 and the transceiver 6. In this embodiment the distortion compensation unit 7 comprises a first interface for connection to the bidirectional link 4 and a second interface for connection to the transceiver 6 of the host device 2. In a possible embodiment the bidirectional link 4 is formed by one optical fibre for transmitting the upstream signal and the downstream signal. In a further embodiment the bidirectional optical link 4 is formed by two separate fibres one being provided for the upstream signal and the other fibre being provided for the downstream signal.

What is claimed is:

1. A method for distortion compensation of signals transmitted via a bidirectional link between a client device and a host device,
    said method comprising the steps of:
    performing a post-distortion-compensation for an upstream signal received by the host device on said bidirectional link by adjusting post-compensation parameters of a post-compensation unit of said host device; and
    transforming the adjusted post-compensation parameters into pre-compensation parameters of a pre-compensation unit of said host device which performs a pre-distortion compensation for a downstream signal transmitted by said host device via said bidirectional link to said client device.

2. The method according to claim 1, wherein a distortion vector is provided depending on post-compensation parameters which are read from said post-compensation unit when the adaptive post-distortion compensation of said upstream signal is accomplished.

3. The method according to claim 2, wherein said distortion vector comprises distortion indicator values indicating an extent of distortion caused by said bidirectional link.

4. The method according to claim 3, wherein the distortion indicator values comprise one or several of the following:
    a chromatic dispersion,
    a polarization mode dispersion,
    a self phase modulation,
    a bandwidth restriction and
    a multipath interference caused by said bidirectional link.

5. The method according to claim 2, wherein a pre-compensation parameter vector is provided in response to the distortion vector and supplied to the pre-compensation unit which performs an adaptive pre-distortion compensation for the downstream signal depending on said pre-compensation parameter vector.

6. The method according to claim 1, wherein said bidirectional link is formed by an optical link for transmission of optical signals.

7. The method according to claim 6, wherein said optical link is formed by at least one optical fibre.

8. The method according to claim 1, wherein said bidirectional link is formed by at least one electrical conductive wire for transmission of electrical signals.

9. The method according to claim 1, wherein said bidirectional link is formed by a wireless link for transmission of radio signals.

10. The method according to claim 1, wherein said adaptive post-distortion compensation is performed by said post-distortion compensation unit by minimizing or maximizing a target value of a target function.

11. The method according to claim 10, wherein said target value comprises a bit error rate and/or an eye signal opening of the received upstream signal received by said host device.

12. The method according to claim 5, wherein the pre-compensation parameters of the pre-compensation parameter vector are generated by reading out a selectable lookup-table depending on the distortion vector or by multiplying a transformation matrix with the distortion vector.

13. The method according to claim 12, wherein the lookup tables or the transformation matrix are stored in a data memory of said host device.

14. The method according to claim 13, wherein the data memory stores several lookup tables or transformation matrices which are selected depending on the type of said bidirectional link between said client device and said host device.

15. A host device comprising:
a host transmitter for transmitting a downstream signal via a bidirectional link to a client device;
a host receiver for receiving an upstream signal via said bidirectional link from said client device;
a predistortion compensation unit for performing a predistortion compensation of said downstream signal transmitted by said host transmitter via said bidirectional link to said client device by adjusting pre-compensation parameters;
a post-distortion compensation unit for performing a post-distortion compensation of said upstream signal received via said bidirectional link by said host receiver from said client device by adjusting post-compensation parameters and
a transformation unit which transforms the adjusted post-compensation parameters provided by said post-distortion unit into pre-compensation parameters of said pre-distortion compensation unit.

16. A data transmission system comprising
at least one host device according to claim 15 and
at least one client device connected to said host device via one or several bidirectional links said bidirectional link being formed by an optical link, an electrical wired link or a wireless link.

17. A data transmission system according to claim 16, wherein the data transmission system comprises an access network.

18. A distortion compensation unit for a host device comprising:
a post-distortion compensation unit for performing a post-distortion compensation for an upstream signal received by the host device on a bidirectional link between a client device and the host device by adjusting post-compensation parameters of said post-distortion compensation unit;
a pre-distortion compensation unit for performing a pre-distortion compensation of a downstream signal; and
a transformation unit which transforms post-compensation parameters provided by said post-distortion compensation unit into pre-compensation parameters supplied to said pre-distortion compensation unit.

* * * * *